United States Patent
Gueron et al.

(10) Patent No.: US 10,432,393 B2
(45) Date of Patent: *Oct. 1, 2019

(54) ARCHITECTURE AND INSTRUCTION SET FOR IMPLEMENTING ADVANCED ENCRYPTION STANDARD (AES)

(71) Applicant: INTEL CORPORATION, Santa Clara, CA (US)

(72) Inventors: Shay Gueron, Haifa (IL); Wajdi K. Feghali, Boston, MA (US); Vinodh Gopal, Westborough, MA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,941

(22) Filed: Jun. 30, 2017

(65) Prior Publication Data

US 2017/0310464 A1    Oct. 26, 2017

Related U.S. Application Data

(63) Continuation of application No. 14/947,944, filed on Nov. 20, 2015, which is a continuation of application
(Continued)

(51) Int. Cl.
*G06F 21/00* (2013.01)
*H04L 9/06* (2006.01)
(Continued)

(52) U.S. Cl.
CPC ........ *H04L 9/0631* (2013.01); *G06F 9/30007* (2013.01); *G06F 21/602* (2013.01); *H04L 9/14* (2013.01); *H04L 2209/24* (2013.01)

(58) Field of Classification Search
CPC ........ H04L 9/0631; H04L 9/14; G06F 21/602
(Continued)

(56) References Cited

U.S. PATENT DOCUMENTS

| 5,727,062 A | 3/1998 | Ritter |
| 5,781,758 A | 7/1998 | Morley |

(Continued)

FOREIGN PATENT DOCUMENTS

| KR | 10-2002-0061718 A | 7/2002 |
| WO | 03/019357 A1 | 3/2003 |
| WO | 2008/083365 A1 | 7/2008 |

OTHER PUBLICATIONS

United States National Institute of Standards and Technology (NIST), "Announcing the Advanced Encryption Standard (AES)", FIPS Publication 197, United States National Institute of Standards and Technology (NIST), Nov. 26, 2001, entire document, https://csrc.nist.gov/csrc/media/publications/fips/197/final/documents/fips-197.pdf.*

(Continued)

*Primary Examiner* — Luu T Pham
*Assistant Examiner* — Ronald Baum
(74) *Attorney, Agent, or Firm* — NDWE, LLP

(57) ABSTRACT

A flexible aes instruction for a general purpose processor is provided that performs aes encryption or decryption using n rounds, where n includes the standard aes set of rounds {10, 12, 14}. A parameter is provided to allow the type of aes round to be selected, that is, whether it is a "last round". In addition to standard aes, the flexible aes instruction allows an AES-like cipher with 20 rounds to be specified or a "one round" pass.

23 Claims, 5 Drawing Sheets

Related U.S. Application Data

No. 14/100,970, filed on Dec. 9, 2013, now Pat. No. 9,230,120, which is a continuation of application No. 13/088,088, filed on Apr. 15, 2011, now Pat. No. 8,634,550, which is a continuation of application No. 11/648,434, filed on Dec. 28, 2006, now Pat. No. 7,949,130.

(51) Int. Cl.
  *G06F 21/60* (2013.01)
  *H04L 9/14* (2006.01)
  *G06F 9/30* (2018.01)

(58) Field of Classification Search
  USPC .......................................................... 380/28
  See application file for complete search history.

(56) References Cited

U.S. PATENT DOCUMENTS

| | | | |
|---|---|---|---|
| 6,028,939 A | | 2/2000 | Yin |
| 6,112,019 A | | 8/2000 | Chamdani |
| 6,192,129 B1 | | 2/2001 | Coppersmith et al. |
| 6,937,727 B2 | | 8/2005 | Yup et al. |
| 7,055,039 B2 | | 5/2006 | Chavanne et al. |
| 7,106,860 B1 | | 9/2006 | Yu et al. |
| 7,107,459 B2 | | 9/2006 | Caronni et al. |
| 7,221,763 B2 | | 5/2007 | Verbauwhede |
| 7,257,229 B1 | | 8/2007 | Leshem |
| 7,260,217 B1 | | 8/2007 | Carlson |
| 7,295,671 B2 | | 11/2007 | Snell |
| 7,392,399 B2 | | 6/2008 | Grohoski et al. |
| 7,502,943 B2 | | 3/2009 | Henry et al. |
| 7,532,722 B2 | | 5/2009 | Crispin et al. |
| 7,536,560 B2 | | 5/2009 | Henry et al. |
| 7,570,760 B1* | | 8/2009 | Olson ............... H04L 9/0637 380/28 |
| 7,606,365 B2 | | 10/2009 | Noh et al. |
| 7,620,821 B1* | | 11/2009 | Grohoski ............ G06F 9/3851 380/1 |
| 7,685,354 B1* | | 3/2010 | Hetherington ...... G06F 12/084 711/163 |
| 7,694,156 B2 | | 4/2010 | Gammel et al. |
| 7,734,043 B1 | | 6/2010 | Jefferson et al. |
| 7,746,350 B1 | | 6/2010 | Danilak |
| 7,783,037 B1 | | 8/2010 | Bong |
| 7,801,301 B2 | | 9/2010 | Macchetti et al. |
| 7,809,132 B2 | | 10/2010 | Nadehara |
| 7,831,039 B2 | | 11/2010 | Bertoni et al. |
| 7,949,130 B2 | | 5/2011 | Gueron et al. |
| 8,020,006 B2 | | 9/2011 | Leung, Jr. |
| 8,054,967 B2 | | 11/2011 | Nonaka et al. |
| 8,069,350 B2 | | 11/2011 | Nowottnick |
| 8,634,550 B2 | | 1/2014 | Gueron et al. |
| 8,817,979 B2 | | 8/2014 | Chu et al. |
| 9,230,120 B2 | | 1/2016 | Gueron et al. |
| 2001/0018736 A1* | | 8/2001 | Hashimoto ........... G06F 21/10 713/1 |
| 2002/0191784 A1 | | 12/2002 | Yup et al. |
| 2002/0191790 A1 | | 12/2002 | Anand et al. |
| 2003/0039355 A1 | | 2/2003 | McCanny et al. |
| 2003/0048903 A1 | | 3/2003 | Ito et al. |
| 2003/0059054 A1 | | 3/2003 | Hu et al. |
| 2003/0091184 A1 | | 5/2003 | Chui |
| 2003/0108195 A1 | | 6/2003 | Okada et al. |
| 2003/0108196 A1 | | 6/2003 | Kirichenko |
| 2003/0133568 A1 | | 7/2003 | Stein et al. |
| 2003/0142818 A1 | | 7/2003 | Raghunathan et al. |
| 2003/0198345 A1 | | 10/2003 | Van et al. |
| 2003/0223580 A1 | | 12/2003 | Snell |
| 2003/0226052 A1 | | 12/2003 | Hill |
| 2004/0047466 A1 | | 3/2004 | Feldman et al. |
| 2004/0103218 A1 | | 5/2004 | Blumrich et al. |
| 2004/0120518 A1* | | 6/2004 | Macy .................. H04L 9/0631 380/29 |
| 2004/0184602 A1* | | 9/2004 | Nadehara ............ H04L 9/0631 380/28 |
| 2004/0202317 A1* | | 10/2004 | Demjanenko ........ H04L 9/0631 380/28 |
| 2004/0202318 A1 | | 10/2004 | Lu |
| 2004/0202319 A1 | | 10/2004 | Hussain et al. |
| 2004/0208072 A1 | | 10/2004 | Henry et al. |
| 2004/0208314 A1 | | 10/2004 | Patariu et al. |
| 2004/0250091 A1* | | 12/2004 | Henry ................ G06F 9/30003 713/189 |
| 2005/0033831 A1* | | 2/2005 | Rashid ................... H04L 49/00 709/220 |
| 2005/0053232 A1 | | 3/2005 | Bace |
| 2005/0132226 A1 | | 6/2005 | Wheeler et al. |
| 2005/0147239 A1 | | 7/2005 | Chin et al. |
| 2005/0169463 A1 | | 8/2005 | Ahn et al. |
| 2005/0175175 A1 | | 8/2005 | Leech |
| 2005/0207571 A1 | | 9/2005 | Ahn et al. |
| 2005/0213756 A1 | | 9/2005 | Hubert |
| 2006/0002549 A1 | | 1/2006 | Avasarala et al. |
| 2006/0005051 A1 | | 1/2006 | Golla et al. |
| 2006/0015754 A1* | | 1/2006 | Drehmel ................ G06F 21/72 713/193 |
| 2006/0018477 A1 | | 1/2006 | Jalfon et al. |
| 2006/0023877 A1 | | 2/2006 | Tsuruga |
| 2006/0050887 A1 | | 3/2006 | Chen |
| 2006/0059314 A1* | | 3/2006 | Bouchard ............. G06F 9/3824 711/138 |
| 2006/0069872 A1 | | 3/2006 | Bouchard et al. |
| 2006/0072746 A1 | | 4/2006 | Tadepalli |
| 2006/0112213 A1 | | 5/2006 | Suzuoki et al. |
| 2006/0120527 A1 | | 6/2006 | Baek |
| 2006/0126835 A1 | | 6/2006 | Kim et al. |
| 2006/0147040 A1 | | 7/2006 | Lee et al. |
| 2006/0188098 A1* | | 8/2006 | Kumagai ............. H04L 9/0637 380/239 |
| 2006/0194386 A1 | | 8/2006 | Yao et al. |
| 2007/0014395 A1 | | 1/2007 | Joshi et al. |
| 2007/0083735 A1 | | 4/2007 | Glew |
| 2007/0098153 A1 | | 5/2007 | Nishikawa |
| 2007/0098155 A1 | | 5/2007 | Nagasawa et al. |
| 2007/0110225 A1 | | 5/2007 | Leventhal et al. |
| 2007/0183594 A1 | | 5/2007 | Russell |
| 2007/0189522 A1 | | 8/2007 | Raju et al. |
| 2007/0189536 A1 | | 8/2007 | Gammel et al. |
| 2007/0237324 A1* | | 10/2007 | Ferguson ............ G06F 9/30029 380/28 |
| 2007/0260823 A1* | | 11/2007 | Dickinson ............ G06F 11/2242 711/153 |
| 2007/0294496 A1* | | 12/2007 | Goss ................... G06F 12/1408 711/163 |
| 2008/0019504 A1 | | 1/2008 | Han et al. |
| 2008/0062803 A1* | | 3/2008 | Fronte ..................... G06F 21/72 365/230.03 |
| 2008/0069339 A1 | | 3/2008 | Parveen et al. |
| 2008/0240426 A1 | | 10/2008 | Gueron et al. |

OTHER PUBLICATIONS

Kiningham, K., et al, 'Cipher Implementation for CESEL', Stanford University, 2016, entire document, https://crypto.stanford.edu/cs359c/17sp/projects/KevinKininghamMauriceShih.pdf.*

Yu, J., et al, 'Vector Processing as a Soft-core CPU Accelerator', FPGA'08, 2008 ACM 978-1-59593-934-0/08/02, entire document, http://www.ece.ubc.ca/~jasony/research/fpga2008-yu.pdf.*

Non-Final Office Action received for U.S. Appl. No. 11/648,434, dated Jul. 30, 2010, 20 pages.

Notice of Allowance received for U.S. Appl. No. 11/648,434, dated Jan. 26, 2011, 12 pages.

Final Office Action received for U.S. Appl. No. 13/088,088, dated Sep. 24, 2012, 24 pages.

Non-Final Office Action received for U.S. Appl. No. 13/088,088, dated Jun. 4, 2013, 31 pages.

Non-Final Office Action received for U.S. Appl. No. 13/088,088, dated May 9, 2012, 18 pages.

Notice of Allowance received for U.S. Appl. No. 13/088,088, dated Sep. 20, 2013, 14 pages.

(56) References Cited

OTHER PUBLICATIONS

Final Office Action received for U.S. Appl. No. 14/100,970 dated Dec. 3, 2014, 23 pages.
Non-Final Office Action received for U.S. Appl. No. 14/100,970 dated Apr. 21, 2015, 24 pages.
Non-Final Office Action received for U.S. Appl. No. 14/100,970 dated Jul. 18, 2014, 26 pages.
Notice of Allowance received for U.S. Appl. No. 14/100,970 dated Sep. 2, 2015, 14 pages.
Final Office Action received for U.S. Appl. No. 14/947,944, dated May 11, 2017, 29 pages.
Non-Final Office Action received for U.S. Appl. No. 14/947,944, dated Jul. 25, 2016, 20 pages.
International Preliminary Report on Patentability received for PCT Patent Application No. PCT/US2007/089175, dated Jul. 9, 2009, 6 pages.
International Search Report and Written Opinion received for PCT Patent Application No. PCT/US2007/089175, dated Jun. 5, 2008, 10 pages.
Grabher, et al., "An Exploration of Mechanisms for Dynamic Cryptographic Instruction Set Extension", CHES 2011, LNCS 6917, International Association for Cryptologic Research, 2011, pp. 1-16.
Lu, et al., "Integrated Design of AES (Advanced Encryption Standard) Encrypter and Decrypter", Proceedings of the IEEE International Conference on Application-Specific Systems, Architectures, and Processors (ASAP'02) 1063-6862/02, 2002, 9 pages.
Tillich, et al., "Accelerating AES Using Instruction Set Extensions for Elliptic Curve Cryptography", ICCSA 2005, LNCS 3481, 2005, pp. 665-675.
Tillich, et al., "An Instruction Set Extension for Fast and Memory-Efficient AES Implementation", International Federation for Information Processing 2005, CMS 2005, LNCS 3677, 2005, pp. 11-21.
Rouse, Margaret, "State Machine", Tech Target, Retrieved from "http://whatis.techtarget.com/definition/state-machine" on May 2, 2017, 4 pages.
Advisory Action from U.S. Appl. No. 15/639,946, dated Feb. 26, 2019, 5 pages.
Amendment after Notice of Allowance for U.S. Appl. No. 13/088,088, dated Dec. 6, 2013, 8 pages.
Final Office Action from U.S. Appl. No. 15/639,969, dated Oct. 26, 2018, 30 pages.
Final Office Action from U.S. Appl. No. 15/639,974, dated Nov. 6, 2018, 48 pages.
Final Office Action from U.S. Appl. No. 15/639,983, dated Nov. 6, 2018, 50 pages.
Final Office Action from U.S. Appl. No. 15/639,991, dated Feb. 14, 2019, 46 pages.
Final Office Action from U.S. Appl. No. 15/639,999, dated Feb. 14, 2019, 55 pages.
Final Office Action from U.S. Appl. No. 14/947,944, dated Oct. 22, 2018, 48 pages.
Final Office Action from U.S. Appl. No. 15/639,936, dated Jul. 12, 2018, 32 pages.
Final Office Action from U.S. Appl. No. 15/639,964, dated Oct. 25, 2018, 41 pages.
Final Office Action from U.S. Appl. No. 15/639,926, dated Jul. 6, 2018, 41 pages.
Final Office Action from U.S. Appl. No. 15/639,946, dated Aug. 27, 2018, 43 pages.
Non-Final Office Action from U.S. Appl. No. 15/639,936, dated Feb. 5, 2019, 47 pages.
Non-Final Office Action from U.S. Appl. No. 14/947,944, dated Dec. 14, 2017, 37 pages.
Non-Final Office Action from U.S. Appl. No. 15/639,926, dated Jan. 25, 2019, 41 pages.
Non-Final Office Action from U.S. Appl. No. 15/639,926, dated Nov. 30, 2017, 14 pages.
Non-Final Office Action from U.S. Appl. No. 15/639,936, dated Dec. 13, 2017, 26 pages.
Non-Final Office Action from U.S. Appl. No. 15/639,946, dated Feb. 7, 2018, 30 pages.
Non-Final Office Action from U.S. Appl. No. 15/639,964, dated Feb. 23, 2018, 30 pages.
Non-Final Office Action from U.S. Appl. No. 15/639,969, dated Mar. 9, 2018, 31 pages.
Non-Final Office Action from U.S. Appl. No. 15/639,974, dated Apr. 6, 2018, 30 pages.
Non-Final Office Action from U.S. Appl. No. 15/639,983, dated Apr. 20, 2018, 28 pages.
Non-Final Office Action from U.S. Appl. No. 15/639,991, dated Jul. 20, 2018, 33 pages.
Non-Final Office Action from U.S. Appl. No. 15/639,999, dated Aug. 9, 2018, 33 pages.
Office Action Response for U.S. Appl. No. 11/648,434, filed Oct. 20, 2010, 9 pages.
Response to Office Action received for U.S. Appl. No. 13/088,088, filed Jul. 12, 2012, 8 pages.
Response to Office Action received for U.S. Appl. No. 13/088,088, filed Jul. 19, 2013, 12 pages.
Response to Office Action received for U.S. Appl. No. 13/088,088, filed Nov. 27, 2012, 14 pages.
Non-Final Office Action from U.S. Appl. No. 14/984,637, mailed Jan. 15, 2019, 38 pages.
Tensilica Inc., "Implementing the Advanced Encryption Standard on Xtensa Processors [online]," searched on Dec. 15, 2011, The Internet URL: http://www.tensilica.com/uploads/pdf/AES_appnote.pdf, Nov. 2005, 77 pages.
NIST., "Specification for the Advanced Encryption Standard (AES)," Federal Information Processing Standards Publication 197, Nov. 26, 2001, 51 Pages.
Bertoni G.M et al., "Speeding Up AES Extending a 32bit Processor Instruction Set," International Conference on Application-specific Systems, Architectures and Processors, 2006, 6 pages.
Atsushi Oshima, "Close up a core micro architecture", IT Media, Feb. 1, 2007, 18 pages., The Internet URL: http://www.itmedia.co.jp/pcuser/articles/0701/24/news002.html.
Notice of Allowance from U.S. Appl. No. 15/639,946, dated Apr. 25, 2019, 20 pages.
Notice of Allowance from U.S. Appl. No. 15/639,974, dated Apr. 26, 2019, 15 pages.
Notice of Allowance from U.S. Appl. No. 15/639,983, dated Apr. 25, 2019, 12 pages.

* cited by examiner

ARCHITECTURE AND INSTRUCTION SET FOR IMPLEMENTING ADVANCED ENCRYPTION STANDARD (AES)

CROSS-REFERENCE TO RELATED APPLICATIONS

This application is a continuation of prior U.S. patent application Ser. No. 14/947,944, filed on Nov. 20, 2015, which is a continuation of prior U.S. patent application Ser. No. 14/100,970, filed on Dec. 9, 2013, now U.S. Pat. No. 9,230,120, which is a continuation of prior U.S. patent application Ser. No. 13/088,088, filed on Apr. 15, 2011, now U.S. Pat. No. 8,634,550, which is a continuation of prior U.S. patent application Ser. No. 11/648,434, filed on Dec. 28, 2006, now U.S. Pat. No. 7,949,130, which is hereby incorporated herein by reference in its entirety and for all purposes.

FIELD

This disclosure relates to cryptographic algorithms and in particular to the advanced encryption standard (AES) algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transforms intelligible data referred to as "plaintext" into an unintelligible form referred to as "cipher text". The transformations in the cipher include (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijndael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

An embodiment of the invention provides an instruction set extension for performing AES encryption and decryption in a general purpose processor.

Figure 1:
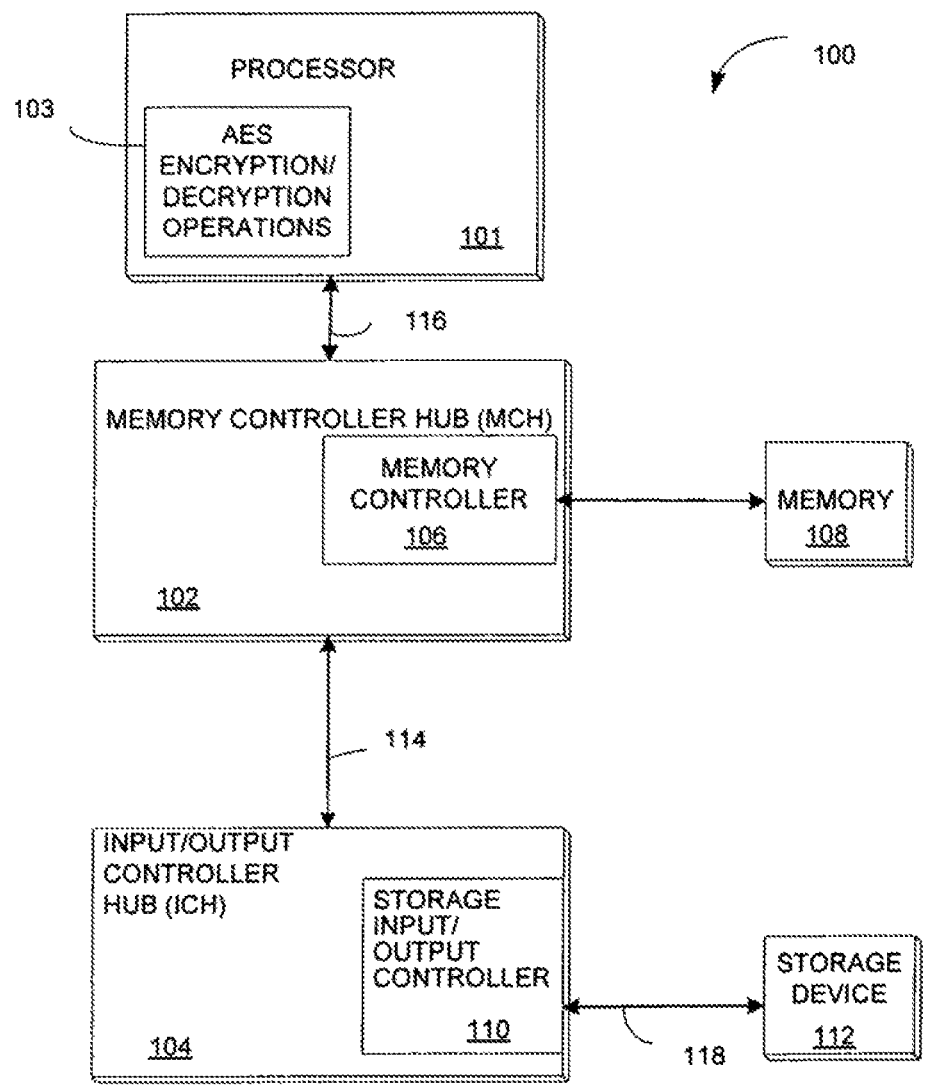
FIG. 1 is a block diagram of a system that includes an embodiment of an instruction set extension for performing AES encryption and decryption in a general purpose processor according to the principles of the present invention.

FIG. 1 is a block diagram of a system 100 that includes an embodiment of an instruction set extension for performing AES encryption and decryption in a general purpose processor according to the principles of the present invention. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

The processor 101 includes an AES function 103 to perform aes encryption and decryption operations. The AES function 103 may be used to encrypt or decrypt information stored in memory 108 and/or stored in the storage device 112.

Figure 2:
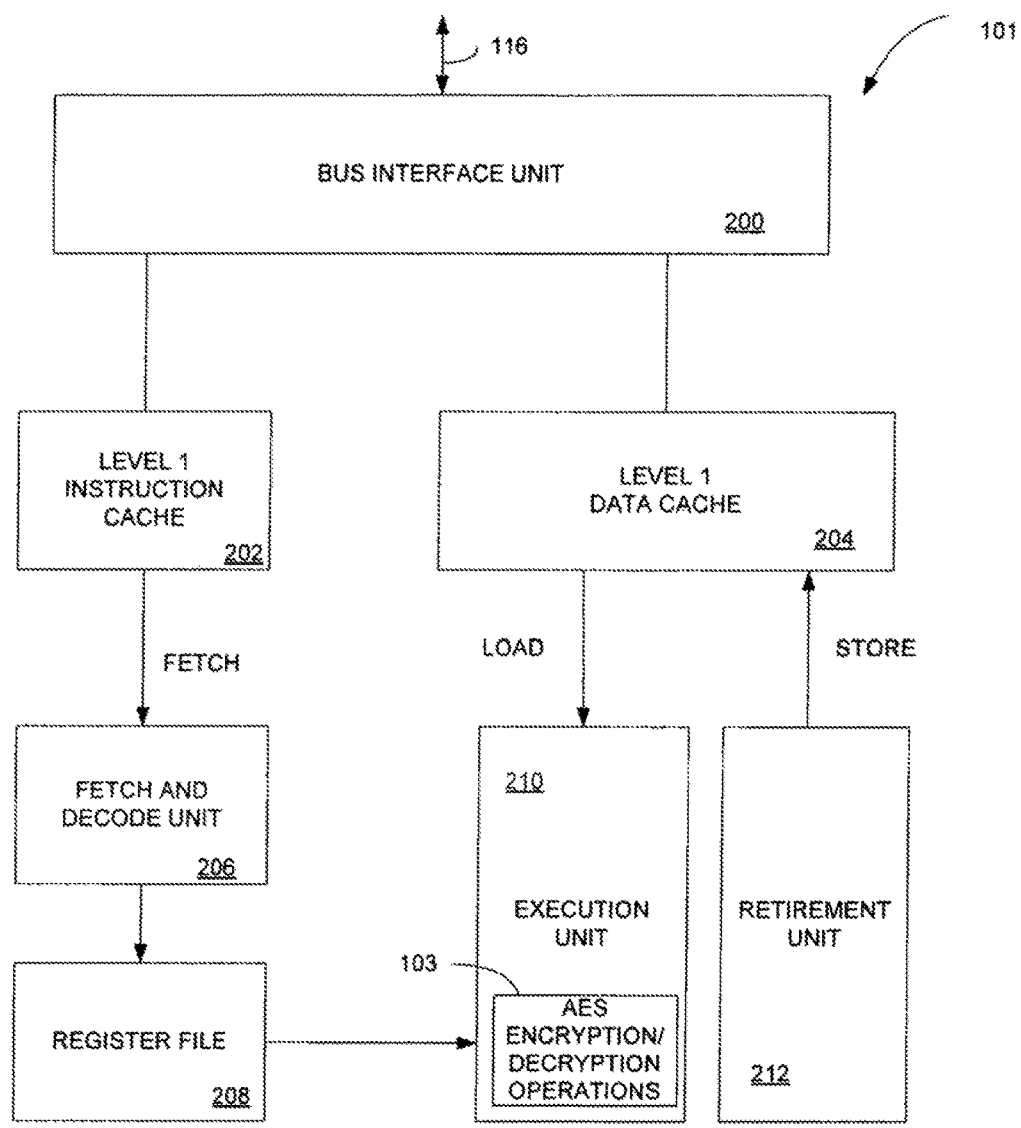
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from Level 1 (L1) instruction cache 202. Data to be used for executing the instruction may be stored in register file 208. In one embodiment, the register file 208 includes a plurality of 128-bit registers, which are used by an aes instruction to store data for use by the aes instruction.

In one embodiment, the register file is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks which may be loaded at one time. Instructions may be applied to a 128-bit block (16 bytes) in one operation.

The fetch and decode unit 206 fetches macroinstructions from L1 instruction cache 202, decodes the macroinstructions and breaks them into simple operations called micro operations (μops). The execution unit 210 schedules and executes the micro operations. In the embodiment shown, the aes function 103 in the execution unit 210 includes micro operations for the aes instruction. The retirement unit 212 writes the results of the executed instructions to registers or memory.

Figure 3:
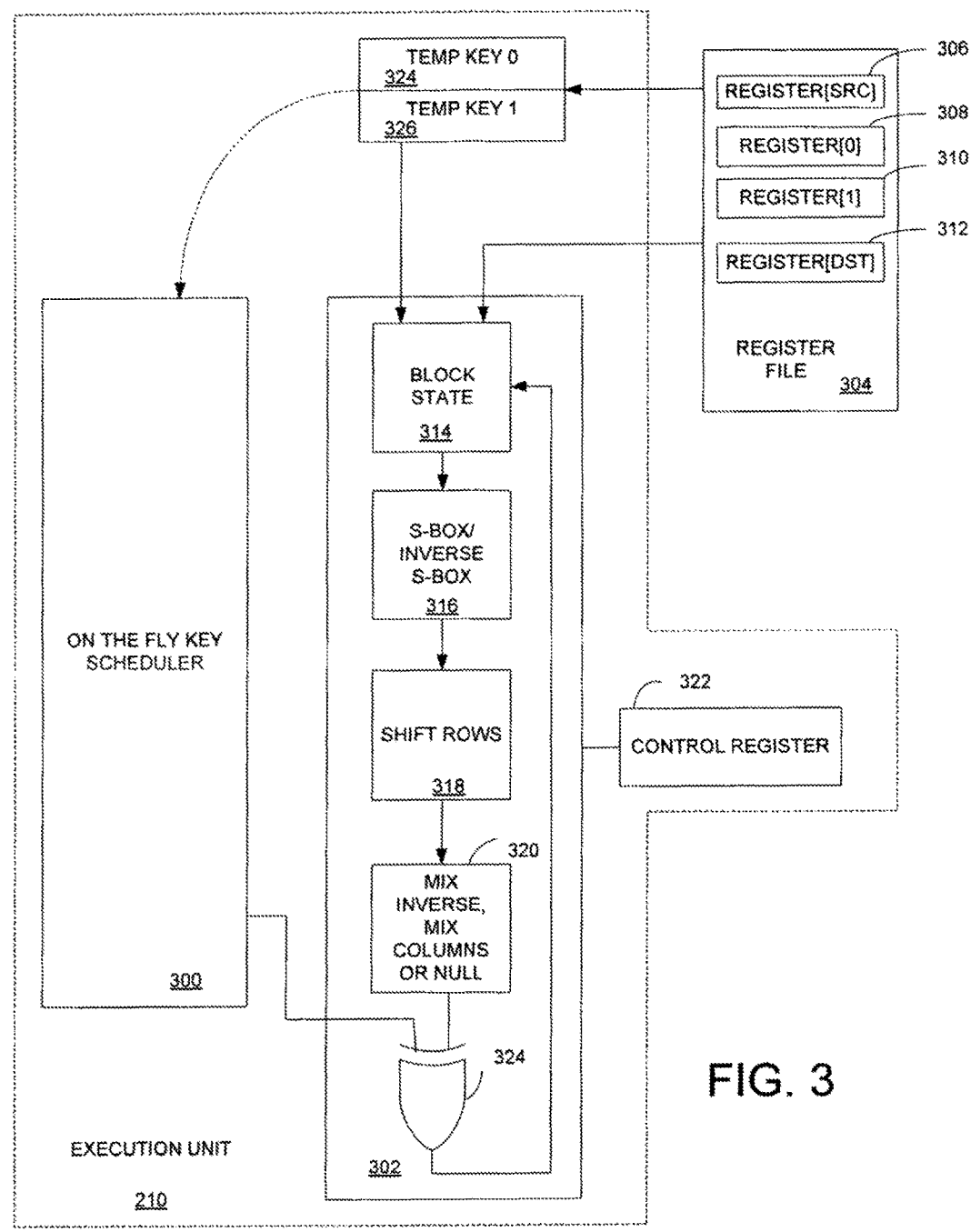
FIG. 3 is a block diagram illustrating an embodiment of an execution unit 210 shown in FIG. 2 for performing AES encryption and decryption according to the principles of the present invention.

FIG. 3 is a block diagram illustrating an embodiment of an execution unit 210 shown in FIG. 2 for performing AES encryption and decryption according to the principles of the present invention.

After an aes instruction has been decoded by the fetch and decode unit 206, the execution of the aes instruction by the execution unit 210 involves performing the micro operations associated with the aes instruction.

An AES instruction (macro instruction) to perform AES encryption or decryption in the AES logic may be defined symbolically as:
 REG[dest]=aes(REG[src],
 key-size={128, 192, 256},
 #rounds={1, 10, 12, 14},
 op={encrypt/decrypt},
 special_last_round={true/false})

The register file 304 has a plurality of 128-bit registers which may be used by the AES instruction. One of the 128-bit registers stores a source operand for the first aes round and another one of the 128-bit registers stores the result of the aes instruction. The source operation is transformed in a number of rounds (1, 10, 12 or 14) to provide a result which is stored in another register in the register file 304. The source operand may be 128-bit of plaintext to be encrypted using the key or 128-bits of cipher text to be decrypted using the key.

Information to be encrypted or decrypted by the aes instruction is loaded into a source register 306 in the register file 304 prior to issuing the aes instruction. The key to be used to encrypt/decrypt the information in the source register 306 is stored in one or more registers in the register file. In the case of a 128-bit key, the entire 128-bits of the key are stored in one of the 128-bit registers in the register file 304, for example, register 308. For key sizes greater than 128 bits, the most significant bits (greater than 128 bits) are stored in another 128-bit register, for example, register 310. The key size parameter for the aes instruction indicates whether the key is stored in one register or more than one register.

In one embodiment, register[0] 308 in the register file 308 is used to store the least significant 128-bits of the key and register[1] 310 is used to store the most significant bits of a key size that is greater than 128-bits. The one or more registers in the register file 304 that store the key are not modified during the execution of the aes instruction.

The key stored the register file is loaded into one or more of the temporary key registers. In an embodiment in which each temporary key register has 128-bits, 128-bits of the key are stored in a first temporary key register 324 and the upper bits of the key greater than 128-bits are stored in a second 128-bit temporary key register 326. Thus, a 256-bit key may be stored between the two temporary registers with the least significant 128-bits stored in one of the temporary key registers, for example, Temp Key 0 324 and the most significant 128-bits stored in the other 128-bit temporary key register, for example, temp key 1 326.

AES has a fixed block size of 128 bits and a key size of 128, 192 or 256 bits and operates on a 4×4 array of bytes (that is, 16 bytes (128-bit fixed block size)), which is referred to as the 'state'. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits).

The execution unit 210 retrieves the source operand and the key which are stored in the register file 304 prior to performing encryption or decryption using the micro operations for the aes instruction. In the embodiment shown, the source operand (128-bit block state) is stored in register 306 and the key is stored in register(s) 308, 310 in the register file 304. After the execution of the aes instruction is complete, the result is stored in register 312 in the register file 304.

The execution unit 210 includes two 128-bit temporary key registers 324, 326 to temporarily store the key. The key is loaded into one or both temporary key registers 324, 326 from one or both registers 308, 310 in the register file 304 dependent on the length of the key.

In order to reduce the memory required for storing the expanded key associated with the key, the execution unit 210 includes an on-the-fly key scheduler 300 that generates the portion of the expanded key (round key) that is used in the current round. The on-the-fly key scheduler 300 expands the n-bytes of a key into b-bytes of an expanded key with the first n-bytes of the expanded key being the original key. For example, for a 128-bit key, the 128-bit key is expanded into a 176-bytes expanded key, that is, 11×16-bytes, with the first 16-bytes being the original 128-bit key, and thus the number of rounds is 10. The 24 bytes of a 192-bit key are expanded into 208 bytes (13×16 bytes) to provide 12 "round keys" one for each of the 12 rounds and the 32 bytes of a 256-bit key are expanded into 240 bytes (15×16 bytes) to provide 14 "round keys" one for each of the 14 rounds. Instead of pre-generating the expanded key and storing it in a table, the on-the-fly key scheduler 300 generates the "round key" on-the-fly, that is, as it is needed for the next aes round.

Upon decoding an aes instruction, a number of parameters to be used to control the flow in each aes round are stored in a control register 232. The parameters include the size of the key, number of rounds, the type of operation and whether there is a special last round. The size of the key may be 128-bits, 192-bits or 256-bits. The number of rounds to be performed (n) may be 1, 10, 12 or 14. AES micro operations perform n rounds of AES accordingly based on the value of n. With a number of rounds value of 10, 12, 14, the aes micro operations may perform the current standard aes for key sizes 128-bits, 192-bits or 256-bits. The operation to be performed may be to encrypt or to decrypt. The special last round may be true or false. By allowing the type of round to be programmable an AES-like cipher with 20 rounds (with an AES-style last round), or only a "one round" pass may be performed using the same aes instruction and aes micro operations.

An aes round includes micro operations for the following stages: block state 314, s-box/inverse s-box 316, shift rows 316 and mix inverse, mix columns or null 320. The aes round performs the following:

In block state 314, the 128-bit input (state) to the aes round is added with a round key (128-bit portion of the expanded key associated with the round) using bitwise XOR to produce a 128-bit intermediate value (state).

In the S-box/inverse S-box 316, each byte of this 128-bit intermediate value is substituted with another byte value that can be stored and retrieved from a lookup table also referred to as a substitution box or "S-Box". The S-box takes some number of input bits, m, and transforms them into some number of output bits, n and is typically implemented as a lookup table. A fixed lookup table is typically used. This operation provides non-linearity through the use of the inverse function over Galois Field (GF)($2^8$). For example, the n-bit output may be found by selecting a row in the lookup table using the outer two bits of the m-bit input, and selecting the column using the inner bits of the m-bit input.

In Shift Rows 318, the results from S-box/inverse S-box 316 passes through a bit-linear transform in which bytes in each row of the 4×4 array (state) received from the Sub Bytes stage are shifted cyclically to the left. The number of places each byte is shifted differs for each row in the 4×4 array.

In Mix Columns 320, the results from Shift Rows 320 passes through a bit-linear transform in which each column of the 4×4 array (state) is treated as a polynomial over a binary Galois Field (GF)($2^8$) and is then multiplied modulo $x^4+1$ with a fixed polynomial $c(x)=3x^3+x^2+x+2$.

A last aes round differs from the other aes rounds in that it omits the fourth stage, that is, Mix Columns.

An exclusive OR (XOR) logic 324 after the Mix Columns stage 320 performs an exclusive OR function on the round key from the expanded key and the result of the aes round.

The following aes macro instruction may be issued to perform aes encryption using a 128-bit key based on aes FIPS Publication 197:
REG[i]=aes(REG[j],
key-size=128,
rounds=10,
op=encrypt,
special_last_round=true)

The 128-bit Key is stored in register 0 308 in the register file 304 prior to the issue of the aes instruction. The parameters, that is, 128, 10, encrypt, true are stored in the control register 322 for use by each aes round. The aes instruction performs 10 aes rounds. With special_last_round set to 'true', the mix column transform stage 320 of the aes round is skipped on the last round, that is, round 10.

For example, the following aes instruction may be issued to perform aes decryption using a 192-bit key based on aes FIPS Publication 197:
REG[i]=aes(REG[j],
key-size=192,
rounds=12,
op=decrypt,
special_last_round=true)

The 128 Least Significant Bits (LSBs) of the Key are stored in register 0 308 in the register file 304 and the 64 Most Significant Bits (MSBs) of the 192-bit Key are stored in register 1 310 of the register file 304 prior issuing the aes instruction. The special_last_round is set to 'true' to indicate that the inverse mix column transform stage 320 of the aes round is to be skipped on the last round, that is, round 12. This assumes that the inverse code to perform decryption takes the same form as encryption.

As the number of rounds parameter may be configured as '1', this allows a separate aes instruction to be issued for each aes round. Thus, instead of just performing a standard number of aes rounds based on key size, a non-standard number of rounds may be performed.

Instead of issuing one aes instruction to perform the standard number of rounds for a particular key size, a separate aes instruction may be issued for each round, as shown below in Table 1.

TABLE 1

REG[j] = REG[j] ^ K
For (i = 1 thru 9){
  Load REG[0] = K[i];
  REG[j] = aes(REG[j],
      key-size =128,
      #rounds=1,
      op=encrypt,
      special_last_round=false)
}
Load REG[0] = K[10];
REG[j] = aes(REG[j],
    key-size=128,
    #rounds=1,
    op=encrypt,
    special_last_round=true)

This example performs a 128-bit AES encrypt with a key whose expanded key is represented as {K[1], K[2], . . . K[10]}. The number of rounds is selected to be '1'. The round key (portion of the expanded key) is loaded into a register in the register file prior to issuing the aes instruction for each aes round. This avoids the need for an on-the-fly key scheduler 300 to be included in the general purpose processor 101 to generate the expanded key from the key. Instead a key scheduler to generate the expanded key from the key may be implemented in software and each portion of the expanded key (round key) may be loaded into the registers prior to each iteration of the loop that issues the aes instruction for a single aes round.

When the aes instruction has the parameter for the number rounds set to '1', the temporary key registers 324, 326 are bypassed and the round key is loaded directly into the block state 314.

In this example, as the portion of the expanded key (round key) for the round is input directly from the register file 304, an XOR instruction is issued to perform the XOR operation prior to entering the loop for performing the aes round by issuing a separate aes instruction for each aes round.

Through the use of the single round aes instruction, the aes instruction may be used to generate variants of AES with different number of rounds and key schedules, that is, variants of AES not defined by FIPS Publication 197. Thus, the single round option provides a flexible aes instruction.

In this embodiment the logic performs one aes round and may be implemented as a hardware state machine sequence. In another embodiment, the logic may be partially implemented as a micro-program stored in a Read Only Memory (ROM).

In this embodiment, 10 general purpose registers are used to store the expanded key. Although general purpose processors may include 16 general purpose registers, other embodiments may reduce the number of general purpose registers used to less than 10. For example, in another embodiment, load instructions are issued to load a set of round keys of the expanded key stored in memory into the general purpose registers. For example, 4 general purpose registers XMM[4:0] may be used to store a subset of the expanded key that is stored in memory. Load instructions are issued to load XMM[2:3] registers from memory while reading registers XMM[1:0] and read/write pointers move in lock-step modulo 4. This provides better usage of the register file while trading off load and memory operations.

Figure 4A:
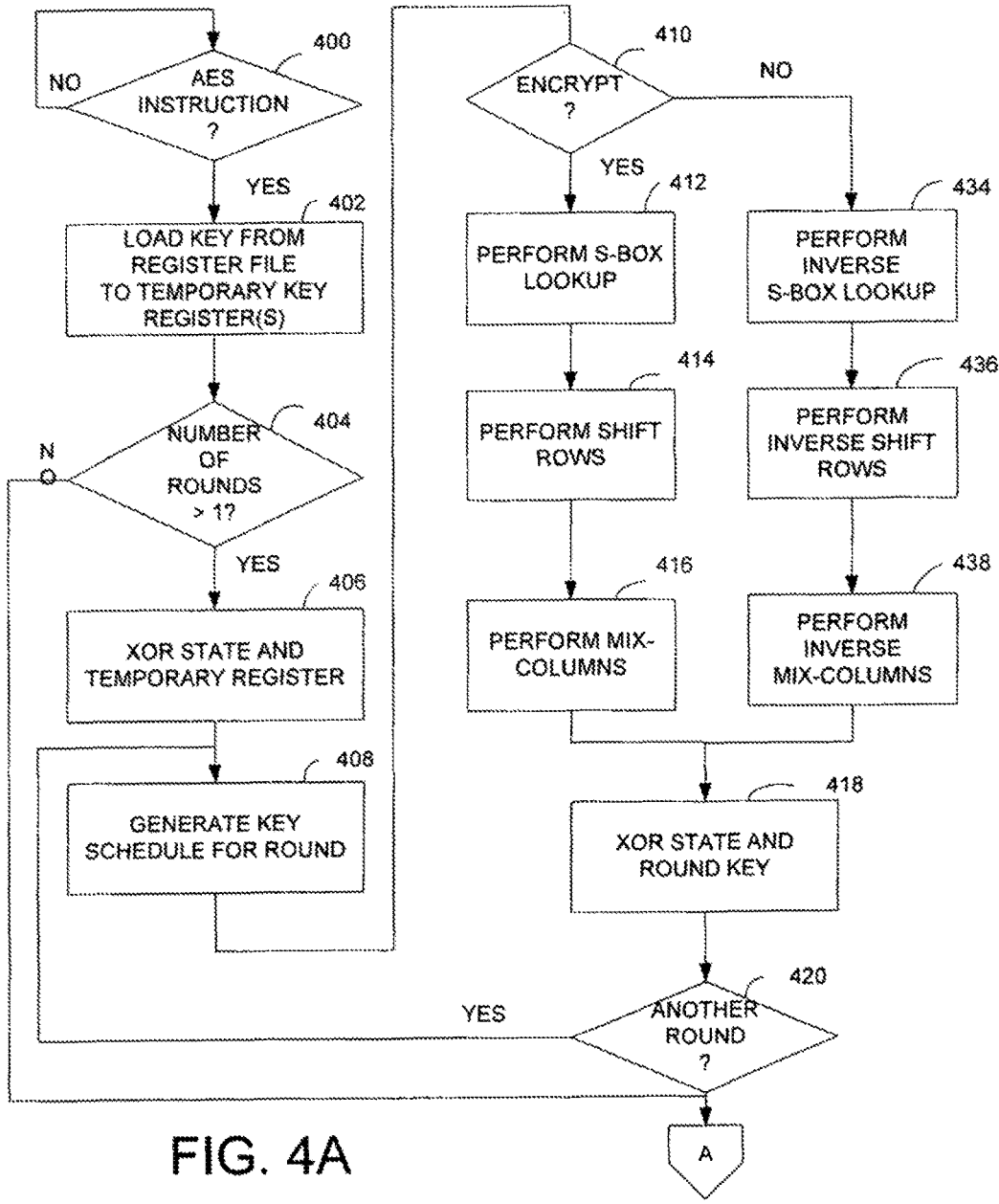
FIGS. 4A-4B is a flow graph illustrating the flow of an AES instruction through the execution unit shown in FIG. 3.
Figure 4B:
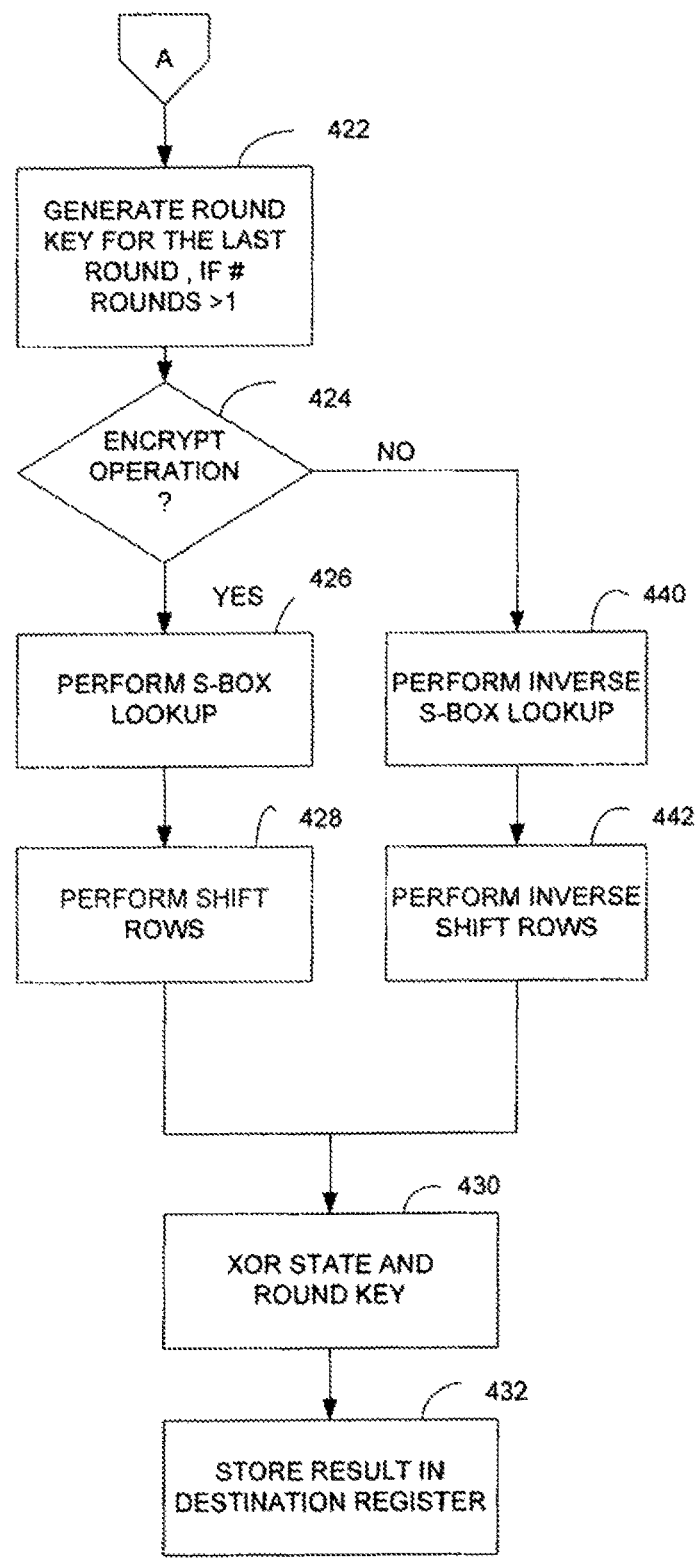

FIGS. 4A-4B is a flow graph illustrating the flow of an aes instruction through the execution unit shown in FIG. 3.

At block 400, the execution waits for an aes instruction. In one embodiment in a general purpose processor with a register file having a plurality of 128-bit registers, the AES instruction has the following format:

REG[dest]=aes(REG[src],
key-size={128, 192, 256},
rounds={1, 10, 12, 14},
op={encrypt/decrypt},
special_last_round={true/false})

If an AES instruction has been decoded by the fetch and decode unit 206, processing continues with block 402. If not, processing remains in block 400 waiting for an aes instruction.

At block 402, during the instruction decode by the fetch and decode unit 206, the key size (key-size), the number of rounds (#rounds), operation (op) and special last round parameters (special_last_round) are stored in the control register 322 for use in performing the operations associated with the aes instruction. For example, in one embodiment, fields (key_size, mds, op, use_NULL_col) in the control register (C_reg) store the following parameters for the AES instruction:

C_reg.key_size=key_size;
C_reg.rnds=rounds;
C_reg.op=op;
C_reg.use_NULL_col=special_last_round;

The key size parameter stored in the control register 322 is used to determine which register(s) 308, 310 in the register file 304 store the key. In an embodiment, if the key size is 128-bits the key is stored in register 0 308 and if the key size is greater than 128-bits, the key is stored in register 0 308 and register 1 310. Dependent on the key size, the key is loaded from the register(s) 308, 310 in the register file 304 to the temporary key register(s) 324, 326 in the execution unit 210 for use by the aes instruction. Processing continues with block 404.

At block 404, if the number of rounds parameter (c_reg.rnds) is greater than 1, processing continues with block 406. If not, processing continues with block 422 to process the last round (that is, round 10, 12, 14 or 1).

At block 406, the 128-bit input (state) to the round is added with the temporary key (128-bit key) using bitwise XOR to produce a 128-bit intermediate value (state). The result of the XOR operation is stored as the 128-bit block state. As the initial state used by the first round is stored in the source register 306 in the register file, the first round performs the XOR operation using the state loaded from the source register 306. Processing continues with block 408.

At block 408, the on-the-fly scheduler 300 computes a round key for the round from the stored in the temporary register(s) 324, 326. Processing continues with block 410.

At block 410, a determination is made as to whether the operation to be performed by the aes instruction is encrypt or decrypt based on the state of the encrypt/decrypt parameter stored in the control registers. If the operation is to encrypt, processing continues with block 412. If the operation is to decrypt, processing continues with block 434.

At block 412, a substitution operation is performed on the 128-bit block state that is, the result from block 406 or 418. Each byte of the 128-bit block state is substituted with another byte value that can be stored and retrieved from a lookup table also referred to as a substitution box or "S-Box". The S-box takes some number of input bits, m, and transforms them into some number of output bits, n and is typically implemented as a lookup table. The result is stored as a 128-bit block state. Processing continues with block 414.

At block 414, the 128-bit block state (4×4 array) passes through a bit-linear transform in which bytes in each row of the 4×4 array are shifted cyclically to the left. The number of places each byte is shifted differs for each row in the 4×4 array. Processing continues with block 416.

At block 416, the 128-bit block state (4×4 array) passes through passes through a bit-linear transform in which each column of the 4×4 array (state) is treated as a polynomial over GF($2^8$) and is then multiplied modulo $x^4+1$ with a fixed polynomial $c(x)=3x^3+x^2+x+2$. Processing continues with block 418.

At block 418, the 128-bit block state input to the next round is added to the 128-bit schedule generated for the next round using bitwise XOR to produce a 128-bit block state. Processing continues with block 420.

At block 420, if there is another round to be processed which is not the last round, processing continues with block 408. The number of rounds to be processed is based on the total number of rounds to be processed stored in the control register and the number of rounds already completed. If all rounds except the last round have been completed, processing continues with block 422 to process the last round.

At block 422, the on-the-fly key scheduler 300 generates the round key from the key stored in the temporary key for the last round of an aes instruction for 10, 12 or 14 rounds. Processing continues with block 424.

At block 424, if the operation stored in the control register for the aes instruction decoded by the instruction decoder is encryption, processing continues with block 426. If not, processing continues with block 440 to perform decryption.

At block 426, an S-box lookup is performed for the last round in a similar manner to the S-box lookup discussed in conjunction with block 412. Processing continues with block 428.

At block 428, a shift rows operation is performed for the last round in a similar manner to that discussed in conjunction with the other rounds in block 414. Processing continues with block 430.

At block 430, the bock state result from block 428 is added to the 128-bit key schedule generated for the last round (10, 12 or 14) or one round (if the number of rounds is one) using bitwise XOR to produce a 128-bit block state. Processing continues with block 432.

At block 432, the result of the encryption (or decryption) operation is stored in the destination register in the register file. Processing for the aes instruction is complete. Table 2 below shows an example of the result of performing AES encryption using a 128-bit key on a 128-bit block input.

TABLE 2

| | |
|---|---|
| 128-bit Input: | 00112233445566778899aabbccddeeff (Hexadecimal) |
| 128-bit Key: | 000102030405060708090a0b0c0d0e0f (Hexadecimal) |
| 128-bit Result: | 69c4e0d86a7b0430d8cdb78070b4c55a (Hexadecimal) |

At block 434, the operation to be performed is decryption. A substitution operation is performed on the 128-bit block state by performing an inverse s-box lookup as defined by the AES standard. Processing continues with block 436.

At block 436, an inverse shift rows operation is performed as defined by the AES standard. Processing continues with block 438.

At block 438, an inverse shift rows operation is performed as defined by the AES standard. Processing continues with block 418.

At block 440, the operation to be performed is decryption. A substitution operation is performed on the 128-bit block state for the last round by performing an inverse s-box lookup as defined by the AES standard. Processing continues with block 442.

At block 442, an inverse shift rows operation is performed for the last round as defined by the AES standard. Processing continues with block 430.

In one embodiment, the blocks in the flowgraph of FIGS. 4A and 4B may be implemented as a hardware state machine sequence. In another embodiment portions of the blocks may be implemented as a micro-program that may be stored in Read Only Memory (ROM). The embodiment in which the blocks are implemented as a hardware state machine sequence may provide higher performance.

In another embodiment, support for the standard aes numbers of rounds, that is, 10, 12, 14 may only be provided. However, support for performing one round as discussed in the embodiment in FIGS. 4A-4B may be provided by a "dormant option". For example, for any number of rounds requested other than the standard aes number of rounds, that is, 10, 12, 14, a no operation (no-op) is performed. Thus, the interface is ready to support other numbers of rounds, if required for future encryption/decryption standards. For example, if new standards for hashing or MAC-ing, attacks on AES are introduced, support for different numbers of rounds may be easily added.

In yet another embodiment, microcode may be used to implement rounds that are less than the aes standard number of rounds.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A system comprising:
a system memory to store instructions and data; and
a processor comprising:
    a plurality of cores;
    a level 1 (L1) instruction cache to store instructions;
    a level 1 (L1) data cache to store data;
    instruction fetch circuitry to fetch the instructions from the L1 instruction cache;
    decode circuitry to decode a Single Instruction Multiple Data (SIMD) instruction specifying that only a single encryption round of the Advanced Encryption Standard (AES) is to be performed, wherein the SIMD instruction has an encrypt/decrypt parameter that is dedicated to specification of whether either one of the single encryption round or a single decryption round of the AES is to be performed;
    a Read Only Memory (ROM) to store micro-operations for the SIMD instruction;
    a first 128-bit source register to store first input data;
    a second 128-bit source register to store second input data; and
    an execution unit including AES execution circuitry, wherein, in response to execution of the SIMD instruction, the AES execution circuitry is to execute the micro-operations to perform a plurality of operations to perform only the single encryption round, including an exclusive OR (XOR) of the first input data and the second input data, a byte substitution transform, and a shift rows transform, and is to store a result to a 128-bit destination storage location.

2. The system of claim 1, wherein the byte substitution transform comprises a substitution of one or more bytes using data retrieved from a substitution table.

3. The system of claim 1, further comprising:
a scheduler to schedule operations to be executed by the processor.

4. The system of claim 1, further comprising:
circuitry to write the result of the SIMD instruction to the 128-bit destination storage location.

5. The system of claim 1, further comprising:
a storage device coupled to the processor to store instructions and data.

6. The system of claim 1, wherein the system memory comprises a dynamic random access memory (DRAM).

7. The system of claim 1, further comprising:
an input/output (I/O) controller to couple the processor to one or more I/O devices.

8. The system of claim 1, further comprising:
a Serial Advanced Technology Attachment (SATA) controller to couple the processor to one or more SATA storage devices.

9. The system of claim 1, wherein the SIMD instruction has:
a parameter to specify a key size; and
a parameter to indicate if the single encryption round is a last round.

10. The system of claim 1, wherein the processor further comprises a retirement unit.

11. The system of claim 1, wherein the processor further comprises key generation logic to generate the round key.

12. The system of claim 1, wherein the SIMD instruction has a parameter dedicated to specification of whether the single encryption round is a final round.

13. The system of claim 1, wherein the processor further comprises a retirement unit, wherein the processor further comprises key generation logic to generate the round key, and wherein the SIMD instruction has a parameter dedicated to specification of whether the single encryption round is a final round.

14. A system comprising:
a system memory to store instructions and data; and
a processor comprising:
  a level 1 (L1) instruction cache to store instructions;
  a level 1 (L1) data cache to store data;
  an instruction decoder to decode a Single Instruction Multiple Data (SIMD) instruction specifying that only a single encryption round of the Advanced Encryption Standard (AES) is to be performed, wherein the SIMD instruction has an encrypt/decrypt parameter that is dedicated to specification of whether either one of the single encryption round or a single decryption round of the AES is to be performed;
  a Read Only Memory (ROM) to store micro-operations for the SIMD instruction;
  a scheduler to schedule operations for execution;
  a first 128-bit source register to store first input data;
  a second 128-bit source register to store second input data; and
  an execution unit including AES execution circuitry, wherein, in response to execution of the SIMD instruction, the execution unit is to execute the micro-operations to perform a plurality of operations to perform only the single encryption round, including an exclusive OR (XOR) of the first input data and the second input data, a byte substitution transform, and a shift rows transform, and is to store a result of the SIMD instruction to a 128-bit destination storage location.

15. The system of claim 14, wherein the byte substitution transform comprises a substitution of one or more bytes using data retrieved from a substitution table, wherein a result of the byte substitution transform comprises an array of substituted data, and wherein the shift rows transform is to shift data in each row of a first array by a specified amount to result in a second array.

16. The system of claim 15, further comprising a storage device coupled to the processor to store instructions and data.

17. The system of claim 16, wherein the system memory comprises a dynamic random access memory (DRAM).

18. The system of claim 17, further comprising an input/output (I/O) controller to couple the processor to one or more I/O devices.

19. The system of claim 18, further comprising a Serial Advanced Technology Attachment (SATA) controller to couple the processor to one or more SATA storage devices, and wherein the processor further comprises a retirement unit, and wherein the SIMD instruction has a parameter to specify a key size, and a parameter to indicate if the single encryption round is a last round.

20. A system comprising:
a system memory to store instructions and data; a processor comprising:
  a level 1 (L1) instruction cache to store instructions;
  a level 1 (L1) data cache to store data;
  an instruction decoder to decode a Single Instruction Multiple Data (SIMD) instruction specifying that only a single encryption round of the Advanced Encryption Standard (AES) is to be performed, wherein the SIMD instruction can be used for both encryption and decryption and has a parameter dedicated to specification of whether the encryption or the decryption is to be performed;
  a Read Only Memory (ROM) to store micro-operations for the SIMD instruction;
  a scheduler to schedule operations for execution;
  a first 128-bit source register to store first input data;
  a second 128-bit source register to store second input data;
  an execution unit including AES execution circuitry, wherein, in response to execution of the SIMD instruction, the execution unit is to execute the micro-operations to perform a plurality of operations to perform only the single encryption round, including an exclusive OR (XOR) of the first input data and the second input data, a byte substitution transform that is to substitute bytes using data retrieved from a substitution table, and a shift rows transform that is to shift data in each row of a first array by a specified amount to produce a second array, and is to store a result of the SIMD instruction to a 128-bit destination storage location; and
  a retirement unit; and
  a Serial Advanced Technology Attachment (SATA) controller to couple the processor to one or more SATA storage devices.

21. The system of claim 20, wherein the parameter is an encrypt/decrypt parameter to specify whether the single encryption round or a single decryption round of the AES is to be performed.

22. The system of claim 20, wherein the SIMD instruction has a parameter to specify a key size, and a parameter to indicate if the single encryption round is a last round, wherein the system memory comprises a dynamic random access memory (DRAM), and further comprising a storage device coupled to the processor to store instructions and data.

23. A system comprising:
a system memory to store instructions and data; and
a processor comprising:
  a level 1 (L1) instruction cache to store instructions; a level 1 (L1) data cache to store data;
  instruction fetch circuitry to fetch the instructions from the L1 instruction cache;
  decode circuitry to decode a Single Instruction Multiple Data (SIMD) instruction specifying that only a single encryption round of the Advanced Encryption Standard (AES) is to be performed, wherein the SIMD instruction has an encrypt/decrypt parameter that is dedicated to specification of whether either one of the single encryption round or a single decryption round of the AES is to be performed;
  a first 128-bit source register to store first input data;
  a second 128-bit source register to store second input data;
  execution circuitry, wherein, in response to execution of the SIMD instruction, the execution circuitry is to perform a plurality of operations to perform only the single encryption round, including an exclusive OR (XOR) of the first input data and the second input data, a byte substitution transform, and a shift rows transform, and is to store a result to a 128-bit destination storage location; and
a retirement unit.

* * * * *